United States Patent
Jordan et al.

(10) Patent No.: US 8,979,982 B2
(45) Date of Patent: Mar. 17, 2015

(54) NEGATIVE PRESSURE VAPOR RECOVERY SYSTEM

(71) Applicant: Jordan Technologies, LLC, Louisville, KY (US)

(72) Inventors: Mark A. Jordan, Louisville, KY (US); Alexander K. Daub, Fisherville, KY (US); Arthur L. Boroff, Scottsdale, AZ (US)

(73) Assignee: Jordan Technologies, LLC, Louisville, KY (US)

( * ) Notice: Subject to any disclaimer, the term of this patent is extended or adjusted under 35 U.S.C. 154(b) by 132 days.

(21) Appl. No.: 13/874,664

(22) Filed: May 1, 2013

(65) Prior Publication Data

US 2014/0326137 A1 Nov. 6, 2014

(51) Int. Cl.
*B01D 53/04* (2006.01)
*B01D 53/047* (2006.01)

(52) U.S. Cl.
CPC ........ *B01D 53/0476* (2013.01); *B01D 53/0454* (2013.01); *B01D 2257/708* (2013.01)
USPC .................................. 95/146; 95/148; 96/113

(58) Field of Classification Search
CPC ............... B01D 53/04; B01D 53/0454; B01D 53/0476; B01D 2257/708
USPC ........... 95/19, 90, 141, 143, 146; 96/113, 143
See application file for complete search history.

(56) References Cited

U.S. PATENT DOCUMENTS

| | | |
|---|---|---|
| 1,496,061 A | 6/1924 | Loomis |
| 2,187,646 A | 1/1940 | Darrieus |
| 2,325,577 A | 7/1943 | Balcar |
| 2,604,185 A | 7/1952 | Johnstone et al. |
| 2,764,178 A | 9/1956 | Herbert et al. |
| 2,853,149 A | 9/1958 | Gosselin |
| 2,919,766 A | 1/1960 | Dillman et al. |
| 3,011,966 A | 12/1961 | Jahnentz et al. |
| 3,183,645 A | 5/1965 | Teller |
| 3,266,262 A | 8/1966 | Moragne |
| 3,282,027 A | 11/1966 | Johnson et al. |
| 3,320,756 A | 5/1967 | Hashemi |
| 3,349,546 A | 10/1967 | Rogers |
| 3,385,029 A | 5/1968 | Vries |
| 3,714,790 A | 2/1973 | Battey |
| 3,763,901 A | 10/1973 | Viland |
| 3,771,317 A | 11/1973 | Nichols |
| 3,775,946 A | 12/1973 | Brazzel |
| 3,830,040 A | 8/1974 | Hendrix |
| 3,830,074 A | 8/1974 | Nichols |
| 3,867,111 A | 2/1975 | Knowles |
| 3,902,874 A | 9/1975 | McAndrew |
| 3,918,932 A | 11/1975 | Lee et al. |
| 3,926,230 A | 12/1975 | Stary et al. |
| 3,972,201 A | 8/1976 | Datis |

(Continued)

FOREIGN PATENT DOCUMENTS

| | | |
|---|---|---|
| EP | 0628336 A1 | 12/1994 |
| JP | 625007 A | 1/1987 |

(Continued)

*Primary Examiner* — Frank Lawrence
(74) *Attorney, Agent, or Firm* — King & Schickli, PLLC

(57) ABSTRACT

A vapor recovery system includes a product handling circuit and a control circuit. The control circuit maintains a negative pressure in the product handling circuit in order to prevent undesirable fugitive vapor emissions.

20 Claims, 2 Drawing Sheets

(56) References Cited

U.S. PATENT DOCUMENTS

| | | | |
|---|---|---|---|
| 4,025,324 A | 5/1977 | Stackhouse, Jr. et al. |
| 4,066,423 A | 1/1978 | McGill et al. |
| 4,074,984 A | 2/1978 | Fuhring |
| 4,077,789 A | 3/1978 | Edwards |
| 4,110,996 A | 9/1978 | Thompson |
| 4,197,095 A | 4/1980 | Picek et al. |
| 4,235,829 A | 11/1980 | Partus |
| 4,259,975 A | 4/1981 | Kinsey, Jr. et al. |
| 4,276,058 A | 6/1981 | Dinsmore |
| 4,279,628 A | 7/1981 | Wymer et al. |
| 4,283,212 A | 8/1981 | Graham et al. |
| 4,286,212 A | 8/1981 | Staebler et al. |
| 4,305,734 A | 12/1981 | McGill |
| 4,331,456 A | 5/1982 | Schwartz et al. |
| 4,338,101 A | 7/1982 | Tuttle |
| 4,343,629 A | 8/1982 | Dinsmore et al. |
| 4,350,018 A | 9/1982 | Frank et al. |
| 4,351,649 A | 9/1982 | Owens et al. |
| 4,392,870 A | 7/1983 | Chieffo et al. |
| 4,462,811 A | 7/1984 | Dinsmore et al. |
| 4,462,881 A | 7/1984 | Yamamoto et al. |
| 4,480,393 A | 11/1984 | Flink et al. |
| 4,504,286 A | 3/1985 | Carlisle et al. |
| 4,536,197 A | 8/1985 | Cook |
| 4,539,019 A | 9/1985 | Koch |
| 4,569,207 A | 2/1986 | James |
| 4,596,586 A | 6/1986 | Davies et al. |
| 4,630,038 A | 12/1986 | Jordan |
| 4,670,028 A | 6/1987 | Kennedy |
| 4,682,549 A | 7/1987 | Hall |
| 4,714,483 A | 12/1987 | Koening et al. |
| 4,715,868 A | 12/1987 | Kennedy |
| 4,816,043 A | 3/1989 | Harrison |
| 4,857,084 A | 8/1989 | Robbins et al. |
| 4,927,434 A | 5/1990 | Cordes et al. |
| 4,963,168 A | 10/1990 | Spencer |
| 4,995,890 A | 2/1991 | Croudace |
| 5,006,138 A | 4/1991 | Hewitt |
| 5,017,240 A | 5/1991 | Brown |
| 5,076,822 A | 12/1991 | Hewitt |
| 5,078,573 A | 1/1992 | Peroaho et al. |
| 5,118,328 A | 6/1992 | Wnuk et al. |
| 5,125,935 A | 6/1992 | Nakaya et al. |
| 5,154,735 A | 10/1992 | Dinsmore et al. |
| 5,176,002 A | 1/1993 | O'Brien et al. |
| 5,187,131 A | 2/1993 | Tiggelbeck et al. |
| 5,194,075 A | 3/1993 | Matsuoka |
| 5,240,481 A | 8/1993 | Li et al. |
| 5,258,056 A | 11/1993 | Shirley et al. |
| 5,269,833 A | 12/1993 | Nitsche |
| 5,294,246 A | 3/1994 | Gardner, Sr. |
| 5,345,771 A | 9/1994 | Dinsmore |
| 5,389,125 A | 2/1995 | Thayer et al. |
| 5,426,945 A | 6/1995 | Menzenski |
| 5,480,475 A | 1/1996 | Tuttle |
| 5,515,686 A | 5/1996 | Jordan |
| 5,584,911 A | 12/1996 | Menzenski |
| 5,591,254 A | 1/1997 | Gibson |
| 5,671,612 A | 9/1997 | Menzenski |
| 5,681,369 A | 10/1997 | Osborne |
| 5,765,395 A | 6/1998 | Menzenski |
| 5,853,455 A | 12/1998 | Gibson |
| 5,871,568 A | 2/1999 | Gibson |
| 6,478,849 B1 * | 11/2002 | Taylor et al. ............... 95/11 |
| 6,540,819 B2 * | 4/2003 | Tom et al. ............... 96/108 |
| 8,376,000 B2 * | 2/2013 | Gray et al. ............... 141/95 |
| 2004/0149346 A1 | 8/2004 | Gee et al. |
| 2007/0267089 A1 * | 11/2007 | Gray et al. ............... 141/59 |
| 2009/0056827 A1 * | 3/2009 | Tschantz ............... 141/45 |

FOREIGN PATENT DOCUMENTS

| | | |
|---|---|---|
| JP | 047013 A | 1/1992 |
| JP | 05228322 A | 9/1993 |
| SU | 1666165 A1 | 7/1991 |

* cited by examiner

NEGATIVE PRESSURE VAPOR RECOVERY SYSTEM

TECHNICAL FIELD

This document relates generally to the field of volatile liquid vapor recovery and, more particularly, to an apparatus and method for improving the efficiency of a vapor recovery system while also lowering the required capital investment to install and maintain that system.

BACKGROUND

When handling volatile liquids such as hydrocarbons including gasoline and kerosene, air-volatile liquid vapor mixtures are readily produced. The venting of such air-vapor mixtures directly into the atmosphere results in significant pollution of the environment. Accordingly, existing environmental regulations require the control of such emissions.

As a consequence, a number of processes and apparatus have been developed and utilized to recover volatile liquids from air-volatile liquid vapor mixtures. Generally, the recovered volatile vapors are liquified and recombined with the volatile liquid from which they were vaporized thereby making the recovery process more economical.

The initial vapor recovery systems utilized in the United States in the late 1920's and early 1930's incorporated a process combining compression and condensation. Such systems were originally only utilized on gasoline storage tanks. It wasn't until the 1950's that local air pollution regulations began to be adopted forcing the installation of vapor recovery systems at truck loading terminals. Shortly thereafter, the "clean air" legislation activity of the 1960's, which culminated in the Clean Air Act of 1968, further focused nationwide attention on the gasoline vapor recovery problem. As a result a lean oil/absorption system was developed. This system dominated the marketplace for a short time.

Subsequently, in the late 1960's and early 1970's cryogenic refrigeration systems began gaining market acceptance (note, for example, U.S. Pat. No. 3,266,262 to Moragne). While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. In contrast, liquid nitrogen cooling systems provide more cooling than is required and are prohibitively expensive to operate for this type of application.

As a result of these shortcomings, alternative technology was sought and adsorption/absorption vapor recovery systems were more recently developed. Such a system is disclosed in a number of U.S. Patents including, for example, U.S. Pat. No. 5,871,568 to Gibson, the disclosure of which is fully incorporated herein by reference. Such systems utilize beds of solid adsorbent selected, for example, from silica gel, certain forms of porous mineral such as alumina and magnesia, and most preferably activated charcoal. These adsorbents have an affinity for volatile hydrocarbon liquids. Thus, as the air-hydrocarbon vapor mixture is passed through the bed, a major portion of the hydrocarbons contained in the mixture are adsorbed on the bed. The resulting residue gas stream comprising substantially hydrocarbon-free air is well within regulated allowable emission levels and is exhausted into the environment.

It should be appreciated that the beds of adsorbent used in these systems are only capable of adsorbing a certain amount of hydrocarbons before reaching capacity and becoming ineffective. Accordingly, the beds must be periodically regenerated to restore the carbon to a level where it will effectively adsorb hydrocarbons again. As a result vapour recovery systems of the type disclosed in the Gibson patent generally include at least two separate reaction vessels holding two separate beds of adsorbent. This allows one bed to be used to recover vapor while the other bed is regenerated. While such a system is effective, it is also relatively expensive to build and maintain for proper operation as it requires two reaction vessels, two beds of adsorbent and relatively complicated piping, valving and control systems.

SUMMARY

In accordance with the purposes described herein an improved vapor recovery system is provided. Such a system is used to recover volatile liquid vapor produced when loading a volatile liquid product into a storage tank, such as an underground storage tank, from a supply tank, such as a tanker truck. The vapor recovery system comprises a product handling circuit including a supply tank, a storage tank, a reaction vessel holding a bed of adsorbent and a control circuit. The control circuit includes a controller that maintains a negative pressure in the product handling circuit in order to prevent undesirable fugitive vapor emissions during a first mode of operation when the volatile liquid product is being loaded into the storage tank from the supply tank and the volatile liquid vapor being produced is captured by the bed of adsorbent. Further, in accordance with another concept, the controller maintains a negative pressure in the product handling circuit in order to prevent undesirable fugitive vapor emissions during a second mode of operation when the bed of adsorbent is regenerated and previously captured volatile liquid vapors are returned to the storage tank.

In one embodiment the reaction vessel includes a lead line and the product handling circuit is a solitary product handling circuit, including a single reaction vessel and bed of adsorbent, under control of the controller. Further the product handling circuit includes (a) a vent line extending from the reaction vessel to the supply tank, (b) a vapor line extending from the lead line to a ullage in the storage tank above a level of volatile liquid product held in the storage tank, (c) a return line extending from the lead line to position immersed in the volatile liquid product held in the storage tank and (d) a volatile liquid product load line extending between the supply tank and the storage tank. Further the control circuit includes a first flow control valve in the vent line, a second flow control valve in the vapor line, a third flow control valve and a vacuum pump in the return line and a pressure sensor to sense pressure in the product handling circuit and provide feedback to the controller. In one embodiment the pressure sensor senses pressure in the vapor line between the second flow control valve and the storage tank.

The control circuit further includes a vapor management unit connected between (a) the vent line between the first flow control valve and the supply tank and (b) the vapor line between the second flow control valve and the storage tank. The vapor management unit includes a Stage I return relief valve set at a first pressure $P_1$, a first atmospheric relief valve set at a second pressure $P_2$ and a second atmospheric relief valve set at a third pressure $P_3$ where $P_3<P_1<P_2$. In one possible embodiment the end of the return line includes a diffusion nozzle immersed in the volatile liquid product held in the storage tank. Further the controller maintains a negative operating pressure $P_4$ within the product handling circuit at all times during normal operation so as to prevent fugitive emissions of volatile liquid vapor. In addition the system includes a purge line and a purge air valve.

In accordance with an additional aspect, a method is provided for preventing fugitive volatile liquid vapor emissions from a vapor recovery system incorporating a product handling circuit where that product handling circuit includes a reaction vessel holding a bed of adsorbent to capture volatile liquid vapors produced when loading volatile liquid product into a storage tank from a supply tank. This method may be broadly described as comprising the steps of operating the product handling circuit as a closed loop between the reaction vessel, the supply tank and the storage tank during loading of said volatile liquid product into said storage tank and maintaining a negative pressure in that closed loop during loading of the volatile liquid product into the storage tank and capturing of the volatile liquid vapor by the bed of adsorbent.

Still further, in accordance with one possible embodiment the method further includes venting the reaction vessel to the supply tank and creating a vacuum condition in the storage tank during loading of volatile liquid product into the storage tank. Further the method includes maintaining a negative pressure in the product handling circuit during regeneration of the bed of adsorbent as the volatile liquid vapor previously captured is released and returned to the storage tank.

In yet another possible embodiment the method includes controlling a vacuum pump of the vapor recovery system during regeneration of the bed of adsorbent so as to maintain a negative pressure in the storage tank. In at least one possible embodiment the method further includes relieving a vacuum condition in the reaction vessel following regeneration of the bed of adsorbent via venting to the storage tank. In addition the method includes filling ullage created in the storage tank with volatile liquid vapor and product recovered from the bed of adsorbent as volatile liquid is pumped from the storage tank for use. In at least one possible embodiment the method includes maintaining a loop between the reaction vessel and the storage tank even when the supply tank is disconnected from the vapor recovery system. Accordingly the method also includes (a) operating the product handling circuit as a closed loop and (b) maintaining a negative pressure within the closed loop when the supply tank is disconnected from the system and volatile liquid product is being pumped from the storage tank for use. Still further the method includes continuously operating the product handling circuit as a closed loop during (a) loading of the volatile liquid product into the storage tank and (b) pumping of said volatile liquid product from the storage tank for use, so long as an operating pressure $P_{operating}$ in the product handling circuit is maintained between a predetermined maximum allowed operating pressure $P_{max}$ and a predetermined minimum allowed operating pressure $P_{min}$.

BRIEF DESCRIPTION OF THE DRAWINGS

The accompanying drawings incorporated herein and forming a part of the specification, illustrate several aspects of the novel vapor recovery system and method and together with the description serve to explain certain principles thereof. In the drawings.

Reference will now be made in detail to the present preferred embodiment of the vapor recovery system illustrated in the accompanying drawings.

DETAILED DESCRIPTION

Figure 1:
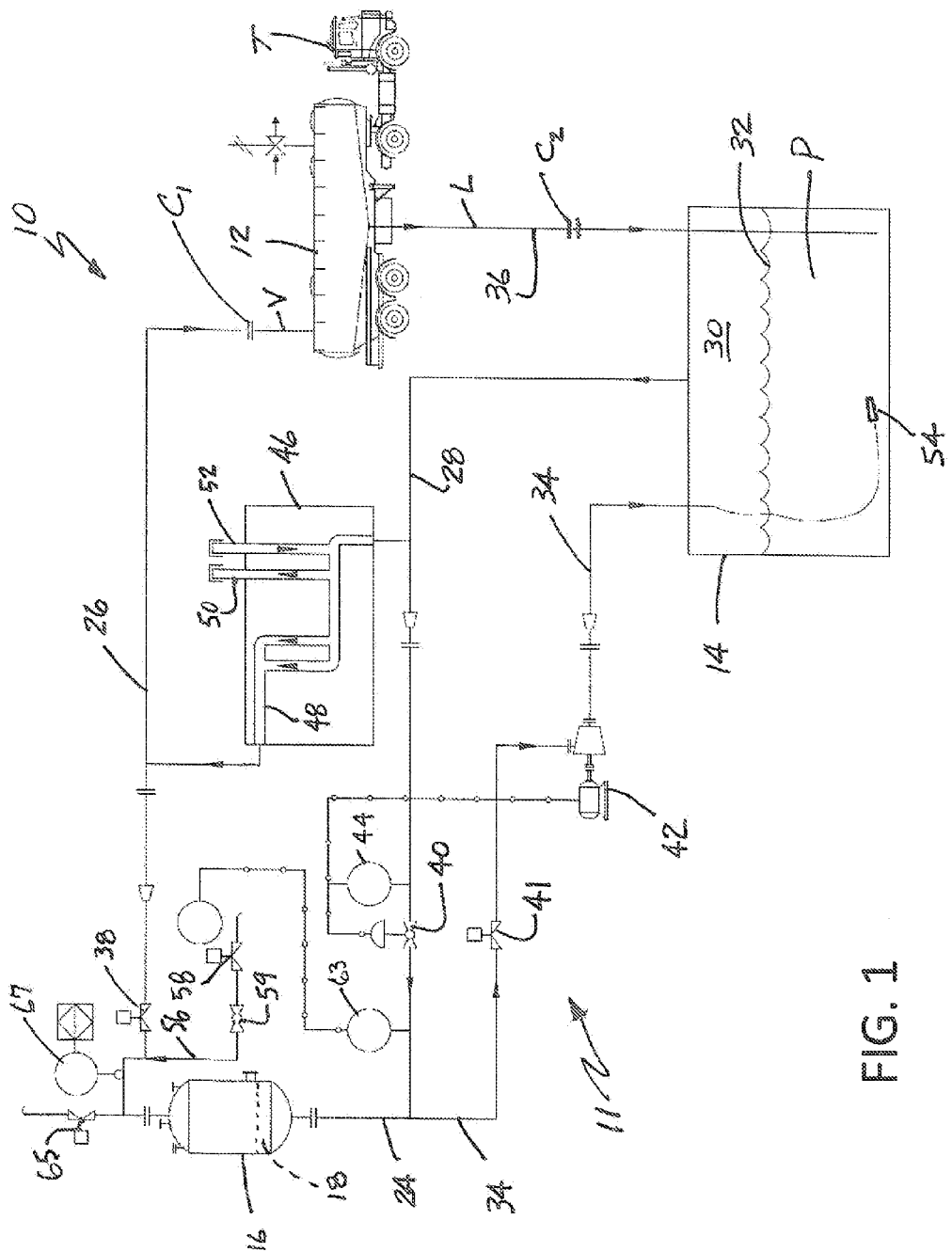
FIG. 1 is a schematical diagram showing the vapor recovery system for recovering volatile liquid vapor produced when loading a volatile liquid product into a storage tank, such as the underground storage tank illustrated, from a supply tank, such as the tanker truck illustrated.
Figure 2:
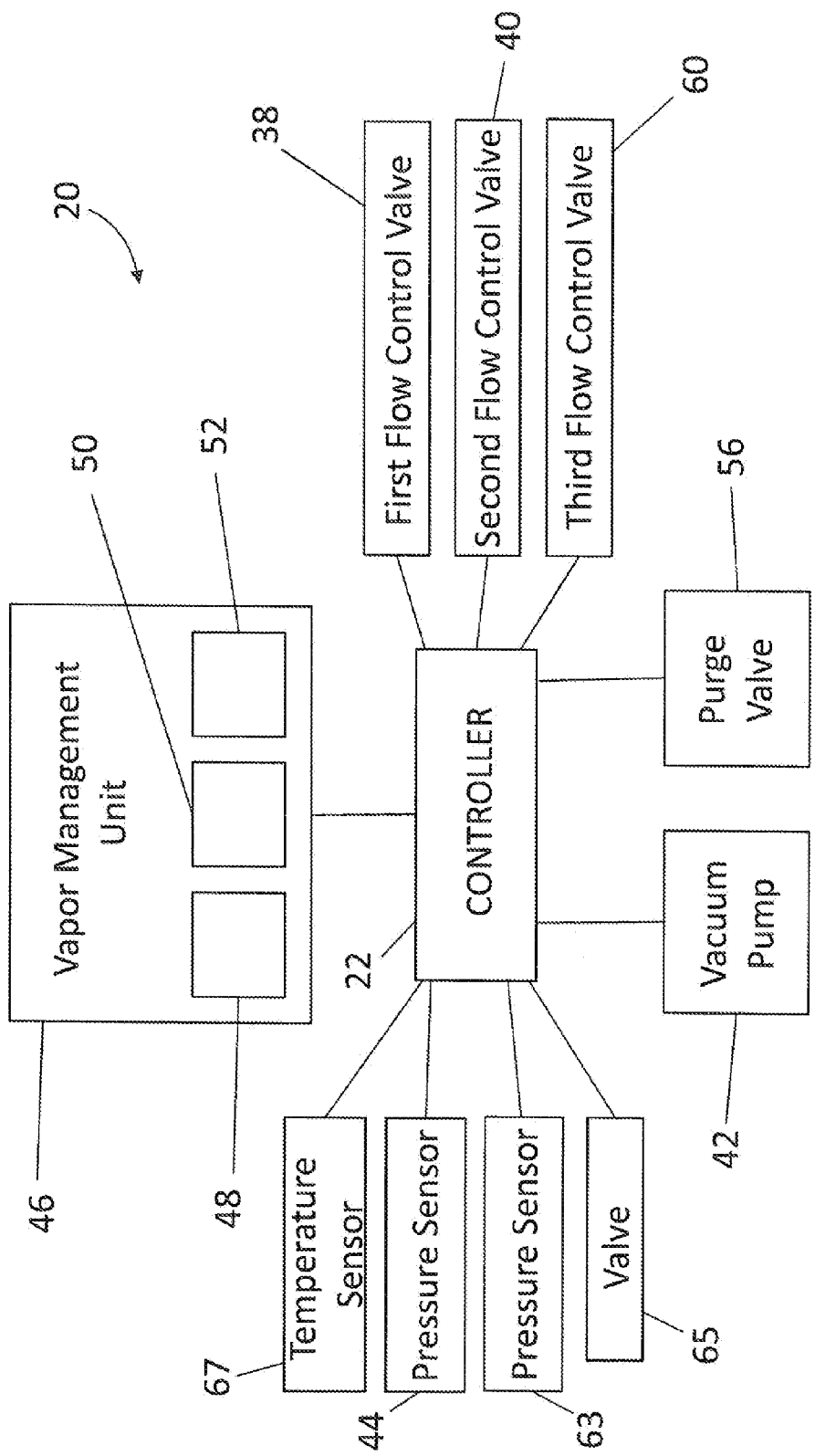
FIG. 2 is a detailed block diagram schematic of the control circuit for the vapor recovery system.

Reference is now made to FIGS. 1 and 2, generally illustrating a single bed closed loop vapor recovery system 10. Such a system 10 recovers volatile liquid vapor produced from loading a volatile liquid product into a storage tank 14 from a supply tank 12. The vapor recovery system 10 comprises a product handling circuit 11 including a supply tank 12, a storage tank 14 and a reaction vessel 16 holding a bed of adsorbent 18. As illustrated, the supply tank 12 is the tank of a tanker truck T and the storage tank 14 is an underground storage tank.

The vapor recovery system also includes a control circuit 20 (see FIG. 2) including a controller 22 such as a dedicated microprocessor or software controlled computing device such as, for example, a MICROLOGIC 1100, model number 1763-L16AWA sold by Allen-Bradley. The controller 22 maintains a negative pressure in the product handling circuit 11 and prevents undesirable fugitive vapor emissions during a first mode of operation when the volatile liquid product is being loaded into the storage tank 14 from the supply tank 12 and the volatile liquid vapor being produced is captured by the bed of adsorbent 18 in the reaction vessel 16.

In accordance with an additional aspect of the vapor recovery system 10, the controller 22 also maintains a negative pressure in the product handling circuit 11 in order to prevent undesirable fugitive vapor emissions during a second mode of operation when the bed of adsorbent 18 is regenerated and previously captured volatile liquid vapor is returned to the storage tank 14 and recombined with the volatile liquid product P held therein.

As further illustrated in FIG. 1 the reaction vessel 16 includes a lead line 24. The product handling circuit 11 further includes (a) a vent line 26 extending from the reaction vessel 16 to the supply tank 12, (b) a vapor line 28 extending from the lead line 24 to a ullage 30 in the storage tank 14 above a level 32 of volatile liquid product P held in the storage tank, (c) a return line 34 extending from the lead line 24 to a position immersed in the volatile liquid product P held in the storage tank and (d) a volatile liquid product load line 36 extending between the supply tank 12 and the storage tank 14.

The control circuit 20 includes a first flow control valve 38 in the vent line 26, a second flow control valve 40 in the vapor line 28, a third flow control valve 41 and a vacuum pump 42 in the return line 34 and a pressure sensor 44 to sense pressure in the product handling circuit 11 and more particularly the storage tank 14 and provide feedback to the controller 22. In the illustrated embodiment the pressure sensor 44 senses pressure in the vapor line 28 between the second flow control valve 40 and the storage tank 14.

As further illustrated in FIGS. 1 and 2, the control circuit 20 also includes a vapor management unit 46 connected between (a) the vent line 26 at a point between the first flow control valve 38 and the supply tank 12 and (b) the vapor line 28 at a point between the second flow control 40 and the storage tank 14. The vapor management unit 46 includes a Stage I return relief valve 48 set at a first pressure $P_1$, a first atmospheric relief valve 50 set at a second pressure $P_2$ and a second atmospheric relief valve 52 set at a third pressure $P_3$ where $P_3<P_1<P_2$. The third pressure $P_3$ is always a negative set pressure to maintain a negative pressure in the circuit 11 and substantially prevent any fugitive emissions. The two atmospheric valves 50, 52 define the normal operating internal pressure range for the product handling circuit 11 for purposes of normal closed loop operation. That range may, for example, be set at between +6" wcg and –10" wcg. The Stage I return relief valve may be set at a pressure of, for example, +5" wcg.

In accordance with additional aspects, the end of the return line 34 may include a diffusion nozzle 54 immersed in the volatile liquid product P held in the storage tank 14. Further, the product handling circuit 11 may also include a purge line 56 and cooperating purge air valve 58 for polishing the bed of adsorbent 18 during the end of the regeneration cycle in a manner that will be described in greater detail below. As should be appreciated the vapor recovery system 10 effectively comprises a solitary product handling circuit 11 under control of the controller 22. That circuit 11 incorporates a single reaction vessel 16 and a single bed of adsorbent 18 while advantageously performing essentially all functions of the dual reaction vessel and dual bed of adsorbent systems well known in the prior art. By eliminating a second reaction vessel and bed of adsorbent as well as the relatively complicated valving, piping and controls associated therewith, the capital cost of the vapor recovery system is significantly reduced. Further, since the controller 22 maintains a negative operating pressure $P_{operating}$ within the product handling circuit 11 at all times during normal operation between the upper and lower pressures $P_{min}$ and $P_{max}$ set by the atmospheric valves 50, 52, it should be appreciated that any fugitive emissions of volatile liquid vapor are effectively prevented (i.e. for purposes of this document, negative pressure means less than atmospheric pressure).

The vapor recovery system 10 is used in a method of preventing fugitive volatile liquid vapor emissions when loading volatile liquid product into a storage tank 14 from a supply tank 12. The method may be broadly described as comprising the steps of operating the product handling circuit 11 as a closed loop between the supply tank 12, the storage tank 14 and the reaction vessel 16 during loading of volatile liquid product into the storage tank and maintaining a negative pressure in the closed loop during loading of the volatile liquid product into the storage tank and capturing of the volatile liquid vapor by the bed of adsorbent 18. In one embodiment the method further includes the venting of the reaction vessel 16 to the supply tank 12 and the creating of a vacuum condition in the storage tank during the loading of volatile liquid product into the storage tank 14. Further the method includes maintaining a negative pressure in the product handling circuit 11 during regeneration of the bed of adsorbent 18 as the volatile liquid vapor previously captured is released and returned to the storage tank 14.

Still further, in at least one possible embodiment the method includes controlling a vacuum pump 42 during regeneration of the bed of adsorbent 18 so as to maintain a negative pressure in the storage tank 14. Further in at least one possible embodiment the method includes relieving a vacuum condition in the reaction vessel 16 following regeneration of the bed 18 of adsorbent via venting to the storage tank 14. Further in at least one possible embodiment the method includes filling ullage 30 created in the storage tank 14 with volatile liquid vapor and product recovered from the bed of adsorbent 18 as volatile liquid is pumped from the storage tank 14 into, for example, automobiles and trucks via gas pumps at a service station. Advantageously, filling the ullage 30 with rich saturated vapors from bed 18 during bed cleaning will not evaporate liquid product P from the storage tank 14.

In accordance with additional aspects, in at least one possible embodiment the method includes maintaining a closed loop between the reaction vessel 16 and the storage tank 14 even when the supply tank 12 is disconnected from the vapor recovery system. This includes (a) operating the product handling circuit 11 as a closed loop and (b) maintaining a negative pressure within the closed loop when the supply tank 12 is disconnected from the system 10 and volatile liquid product is being pumped from the storage tank 14 for use. In at least one possible embodiment this includes continuously operating the product handling circuit 11 as a closed loop during (a) loading of the volatile liquid product into the storage tank 14 and (b) pumping of said volatile liquid product from the storage tank for use, so long as the operating pressure $P_{operating}$ in the product handling circuit is maintained between a predetermined maximum allowed operating pressure $P_{max}$ and a predetermined minimum operating pressure $P_{min}$ set by the first and second atmospheric relief valves 50, 52. Thus the method includes operating the product handling circuit 11 as a closed loop at all times except when (a) polishing the bed of adsorbent 18 with purge air which enters the system through the purge line 56 past the purge air valve 58 (and hand valve 59 which sets the flow rate) or (b) when the storage tank 14 is breathing in a manner that will be described in greater detail below.

The following narrative further describes the operation of the system 10 and method. A delivery truck T arrives to drop a load of gasoline. The trucker will hook up the liquid drop L and vapor recovery lines V to the wet stock product tank 12 of the truck T at the connectors $C_1$ and $C_2$. Once he hooks up the vapor recovery hose V a permissive switch is made to start the recovery process. Alternatively a permissive may be given by the station operator through, for example, a human interface with the controller 22. When this permissive is made, the controller 22 opens the first and second flow control valves 38, 40 while the third control valve 41 is maintained closed. As the truck T starts to drop the gasoline load the vapor space or ullage 30 in the underground storage tank 14 pressurizes forcing the displaced volatile organic compound (VOC) vapors out of the underground storage tank. These vapors then pass via the vapor line 28 into and through the carbon bed 18. The displaced VOC vapors will be approximately between a 30-50% VOC concentration with a balance of air. As the VOC laden vapors flow and pass through the carbon bed 18 the VOCs will adsorb on the carbon and only clean air will vent via valve 38 back to the delivery truck T. This air flow from the carbon bed 18 to the truck T or supply tank 12 will be approximately 30-50% less than the input from the tank vapors due to adsorption on the carbon bed 18. This will cause the vent line 26 from the carbon bed 18 to the truck T as well as the vapor space in the supply tank 12 to immediately go into a vacuum. This vacuum will in turn transfer to the carbon bed 18 and the underground storage tank 14 causing a suction on the carbon bed, vapor line 28 and the underground storage tank (vapor side) allowing the truck to unload faster and eliminate all fugitive emissions during an unloading drop in the complete service station liquid/vapor system.

Prior art vapor recovery systems do not maintain the tank 12 and the entire product handling circuit 11 at a negative pressure much less at a low pressure during storage tank loading. In fact, prior art systems require maintaining the supply tank 12 at a slight positive pressure to encourage transfer of gasoline or product from the supply tank to the storage tank 14. To do this requires the use of oversized piping, which is capital costly and electrically inefficient compared to that used with the current system 10. Therefor the current system 10 does the same work at less capital cost and uses less power so it is less expensive to operate than a typical prior art vapor recovery system. Since prior art systems operate at a positive pressure, that is one greater than atmospheric pressure, they also cannot claim the reduced fugitive emissions characteristic of the current negative pressure system 10.

Please note while flow control valves 38, 40 are opening (it takes a few seconds) the underground storage tank pressure might exceed +5" wcg. If this happens, the vapor management system 46 will relieve this pressure bypassing the carbon bed 18 and allowing the vapors to go directly to the supply tank 12 of the truck T. Once valves 38, 40 are open they will stay open until the permissive is canceled.

When the permissive is canceled, the controller 22 closes the flow valves 38, 40. Once closed if the truck T is still loading, any volatile liquid vapors that are generated in the storage tank 14 simply bypass the carbon bed 18 and pass through the vapor management system 46 by means of the valve 48 directly into the truck supply tank 12 of the T. This bypass also occurs if the service station system 10 is shut down on a fault or for maintenance.

Due to the fact that the VOC/air mixture is being processed through the carbon bed 18 which removes the VOC vapor, the product handling circuit 11, the supply tank 12, the vapor management system 46 and the storage tank 14 are all operated under a negative pressure or vacuum eliminating any fugitive emission. When the truck T has finished unloading the underground storage tank 14 will also be at a negative pressure. Other prior art systems would be at a positive pressure. Thus whereas the system 10 eliminates fugitive emissions by operating at a negative pressure, prior art systems will have the potential for fugitive emissions by operating at positive pressure (e.g. for purposes of this document, positive pressure means above atmospheric pressure).

Once valves 38 and 40 are closed the controller 22 opens return flow control valve 41 and turns on the vacuum pump 42 to clean the carbon bed 18. Please note however the vacuum pump 42 is turned off if the tank pressure ever exceeds a −1" wcg as monitored by pressure sensor 44. This is done to maintain a negative pressure within the closed loop circuit 11 and prevent the venting of vapors into the environment via the vapor management system 46 except during an emergency. Due to the fact the storage tank 14 is under a vacuum as soon as loading stops (possibly up to −10" wcg) vacuum regeneration of the bed 18 may be commenced immediately. Depending upon the size of the carbon bed 18 and the vacuum pump 42 as well as customer loading patterns it may require anywhere between 1-24 hours to clean the bed 18 all the while keeping the storage tank 14 at a −1" wcg. If necessary, the controller 22 can alternatively speed up or slow down the vacuum pump 42 to achieve the same results. Because the storage tank 14 starts at a negative pressure and is kept negative during cleaning there is zero fugitive emission. In contrast, prior art systems start with a storage tank under positive pressure and it stays that way for some time until the vapor is processed over a great time period. At that point a prior art system may be at a slight positive or slight negative vacuum. During this vapor processing time a prior art system has the potential to produce fugitive emission.

Typically the bed 18 is fully cleaned in 8 hours. While the carbon bed 18 is being cleaned, the vacuum pump 42 is discharging a 40% to 90% concentration hydrocarbon vapor into the gasoline tank liquid via the return line 34 and the diffusion nozzle 54. Once this rich saturated VOC vapor disperses up through the gasoline product P, the vapor concentration will drop to 30-45% concentration when it comes into the tank vapor or ullage space 30. The removed VOCs are absorbed back into the gasoline or product P as a recovered gasoline product. Significantly, there is no need to ingest air into the storage tank 14 and induce tank breathing in the present method and system 10.

Even though the vacuum pump 42 is discharging a vapor into the storage tank 14 the storage tank pressure is not increasing above −1" wcg. This is due to the fact that vacuum cleaning is started at a highly negative tank pressure and cars are being simultaneously loaded thereby removing liquid from the same storage and creating a further vapor void (negative pressure). In addition, the controller 22 is controlling the vacuum pump run time or capacity by speed control based upon pressure monitoring by the pressure sensor 44. During car loading it might be possible to reach the vacuum relief valve setting allowed by the EPA or other regulatory body. With this in mind the carbon bed 18 may be quickly cleaned and the underground storage tank 14 may be operated at a negative vacuum at all times during bed cleaning cycle to prevent fugitive emissions. If a level of vacuum in the storage tank 14 ever reaches the vacuum relief setting value then the vapor management unit 46 will allow air to flow into the storage tank 14 to not allow the tank to go into a deeper vacuum. If by chance the storage tank pressure goes above −1" wcg as monitored by pressure sensor 44 the vacuum pump 42 is slowed down or shut off and carbon bed cleaning is delayed until the pressure drops back below −1.5" wcg. This again prevents the release of harmful VOC vapors into the atmosphere.

Once the carbon bed cleaning cycle is started, it will continue until complete. During the last period of the cleaning cycle a deep vacuum of approximately 2.5 Hga purge air will be introduced into the bed via purge line 56 and purge valve 58 at a rate controlled by hand valve 59. Purge air is used to "fine polish" or deep clean the carbon in the bed 18. More specifically, the pressure sensor 63 monitors the adsorption pressure in the reaction vessel 16. Upon reaching a predetermined trigger pressure, the controller 22 responds to the signal from the sensor 63 and opens the purge valve 58. On a rare occasion the facility might receive a second drop of gasoline into the storage tank 14 before bed cleaning in complete. In this scenario the truck T may load but the vapor generated from loading will bypass reaction vessel 16 and carbon bed 18 via the valve 48 of the vapor management unit 46 and the vapor will proceed directly to the truck T as it would in any typical Stage I loading facility.

Once the carbon bed 18 cleaning cycle is completed, the vacuum pump 42 is turned off and valve 41 is closed by the controller 22. At this time the carbon bed 18 is under a full vacuum and needs to be brought back to atmospheric pressure. At this same time the storage tank 14 is at some negative pressure. If the pressure sensor 63 senses a pressure in the storage tank 14 greater than −1" wcg (a positive pressure) the valve 40 (a 4-20 mA modulating valve) is cracked open to relieve this positive pressure by pulling this positive pressure into the negative pressure carbon bed 18. Again by requiring the storage tank 14 to remain at a negative pressure all fugitive emission and tank breathing (vapor/product loss) is effectively prevented. If the pressure sensor 44 senses a vacuum in the storage tank 14 greater than −2" wcg, valve 40 is closed again. This cycle will continue until the bed 18 is at zero pressure.

If a truck T does arrive for loading while the system 10 is relieving vacuum in the carbon bed 18, that will not be an issue for truck unloading operations. Valve 40 will continue to relieve the vacuum in the carbon bed 18 until that valve is fully open. If at any point the controller 22 receives signals indicating that valve 40 is open and the permissive is made, valve 38 will also open to repeat the loading cycle. Alternatively once valve 40 is open and there is no permissive the system stays in the shutdown mode with valve 40 open. Additionally valve 65 is also opened. Valve 65 is a solenoid valve located between the carbon bed 18 and valve 38. Valve 65 opens to atmosphere. Valves 40 and 65 will stay open at all times when the VRU is shut off in the standby mode. In this mode, if the storage tank 14 increases in pressure, the VOC vapor will pass through the carbon bed 18 stripping the vapors clean and clean air will vent into the atmosphere. Alternately if the storage tank 14 goes into a vacuum, clean air will reverse flow from the atmosphere into the carbon bed 18 back into the tank 14 to relieve a negative pressure. Thus, tank breathing is completed without using any power or pumps. In contrast, prior art systems generally require the use of power and pumps to accommodate this breathing.

When it is time to drop a new load from tanker truck T and a permissive is made the system 10 will go back into normal operation and the cycle will repeat itself all over.

In summary, numerous benefits result from employing the system 10 and the related method. The single reaction vessel 16 and adsorbent bed 18 of the system 10 is far less complicated and expensive than prior art systems requiring multiple reaction vessels, adsorbent beds and the complicated piping, valving and control systems associated therewith. By employing a simple bed 18 that vents during storage tank loading to the supply tank 12 of the delivery truck T instead of to atmosphere, a negative pressure is created in the storage tank 14 that provides a number of benefits including faster loading and virtual elimination of fugitive emissions. This negative pressure is maintained throughout the handling circuit 11 by controlling the operation of the vacuum pump 42.

The system 10 is designed with a single bed 18 of adsorbent having the capacity to handle a Stage I truck drop at a negative pressure. By returning all of the carbon bed 18 regeneration vapors back to the storage tank 14, it is possible to significantly reduce and even eliminate the need to ingest air to maintain a proper pressure in the storage tank 14 as product is removed from the storage tank and delivered to customer vehicles. As this ingestion of air, common to prior art systems, evaporates gasoline product, it often causes the tank pressure to increase eventually forcing an undesired venting to atmosphere. In contrast, the system 10 virtually eliminates air ingestion and the gasoline vaporization, product loss and emissions associated therewith.

Further, by relieving the vacuum in the bed 18 following regeneration via venting to the storage tank 14 in a controlled manner through the valve 40 under control of the controller 22, it is possible to maintain the storage tank 14 at a negative pressure to prevent storage tank breathing and thereby reduce vapor loss and emissions. This also allows capture of some Stage II venting. By using a closed loop system (bed 18 vents to supply tank 12 of truck T), there is no ambient emission point thereby eliminating some EPA permitting and source testing. The system 10 also uses less carbon than a prior art dual bed system and has lower maintenance costs.

The foregoing has been presented for purposes of illustration and description. It is not intended to be exhaustive or to limit the embodiments to the precise form disclosed. Obvious modifications and variations are possible in light of the above teachings. For example, the control circuit 20 could include a temperature sensor 67 to monitor the temperature of the carbon bed 18 during loading of fuel into the storage tank 14 and send a temperature signal to the controller 22. If the bed temperature exceeds a certain predetermined value at any time, the controller 22 will shut down the system for safety reasons. All such modifications and variations are within the scope of the appended claims when interpreted in accordance with the breadth to which they are fairly, legally and equitably entitled.

What is claimed:

1. A vapor recovery system for recovering volatile liquid vapor produced when loading a volatile liquid product into a storage tank from a supply tank, said vapor recovery system comprising:
   a product handling circuit including a supply tank, a storage tank and a reaction vessel holding a bed of adsorbent; and
   a control circuit including a controller that maintains a negative pressure in said product handling circuit in order to prevent undesirable fugitive vapor emissions during a first mode of operation when said volatile liquid product is being loaded into said storage tank from said supply tank and said volatile liquid vapor being produced is captured by said bed of adsorbent.

2. The system of claim 1 wherein said controller maintains a negative pressure in said product handling circuit in order to prevent undesirable fugitive vapor emissions during a second mode of operation when said bed of adsorbent is regenerated and previously captured volatile liquid vapor is returned to said storage tank.

3. The system of claim 1 wherein said reaction vessel includes a lead line and said product handling circuit is a solitary product handling circuit under control of said controller.

4. The system of claim 3, wherein said product handling circuit further includes (a) a vent line extending from said reaction vessel to said supply tank, (b) a vapor line extending from said lead line to a ullage in said storage tank above a level of volatile liquid product held in said storage tank, (c) a return line extending from said lead line to a position immersed in said volatile liquid product held in said storage tank and (d) a volatile liquid product load line extending between said supply tank and said storage tank.

5. The system of claim 4, wherein said control circuit includes a first flow control valve in said vent line, a second flow control valve in said vapor line, a third flow control valve and a vacuum pump in said return line and a pressure sensor to sense pressure in said product handling circuit and provide feedback to said controller.

6. The system of claim 5, wherein said pressure sensor senses pressure in said vapor line between said second flow control valve and said storage tank.

7. The system of claim 6, wherein said control circuit further includes a vapor management unit connected between (a) said vent line between said first flow control valve and said supply tank and (b) said vapor line between said second flow control valve and said storage tank.

8. The system of claim 7, wherein said vapor management unit includes a Stage I return relief valve set at a first pressure $P_1$, a first atmospheric relief valve set at a second pressure $P_2$ and a second atmospheric relief valve set at a third pressure $P_3$ where $P_3 < P_1 < P_2$.

9. The system of claim 8 wherein an end of said return line includes a diffusion nozzle immersed in said volatile liquid product held on said storage tank.

10. The system of claim 8 wherein said controller maintains a negative operating pressure $P_4$ within said product handling circuit at all times during normal operation so as to prevent fugitive emissions of volatile liquid vapor.

11. The system of claim 4, further including a purge airline and purge air valve.

12. A method of preventing fugitive volatile liquid vapor emissions from a vapor recovery system incorporating a product handling circuit including a reaction vessel holding a bed of adsorbent for capturing volatile liquid vapors produced when loading volatile liquid product into a storage tank from a supply tank, said method comprising:

operating the product handling circuit as a closed loop between said reaction vessel, said supply tank and said storage tank during loading of said volatile liquid product into said storage tank; and maintaining a negative pressure in said closed loop during loading of said volatile liquid product into said storage tank and capturing of said volatile liquid vapor by said bed of adsorbent.

13. The method of claim 12, further including venting said reaction vessel to said supply tank and creating a vacuum condition in said storage tank during loading of volatile liquid product into the storage tank.

14. The method of claim 12, further including maintaining a negative pressure in said product handling circuit during regeneration of said bed of adsorbent as said volatile liquid vapor previously captured is released and returned to said storage tank.

15. The method of claim 14, including controlling a vacuum pump of said vapor recovery system during regeneration of said bed of adsorbent so as to maintain a negative pressure in said storage tank.

16. The method of claim 12, including relieving a vacuum condition in said reaction vessel following regeneration of said bed of adsorbent via venting to said storage tank.

17. The method of claim 12, including filling ullage created in said storage tank with volatile liquid vapor and product recovered from said bed of adsorbent as volatile liquid is pumped from said storage tank for use.

18. The method of claim 14, including maintaining a loop between said reaction vessel and said storage tank even when said supply tank is disconnected from said vapor recovery system.

19. The method of claim 18, including (a) operating the product handling circuit as a closed loop and (b) maintaining a negative pressure within said closed loop when said supply tank is disconnected from said system and volatile liquid product is being pumped from said storage tank for use.

20. The method of claim 19 including continuously operating said product handling circuit as a closed loop during (a) loading of said volatile liquid product into said storage tank and (b) pumping of said volatile liquid product from said storage tank for use, so long as an operating pressure $P_{operating}$ in said product handling circuit is maintained between a predetermined maximum allowed operating pressure $P_{max}$ and a predetermined minimum operating pressure $P_{min}$.

* * * * *